United States Patent
Zheng et al.

(10) Patent No.: US 9,594,976 B2
(45) Date of Patent: Mar. 14, 2017

(54) SPARSE APPEARANCE LEARNING-BASED SEGMENTATION

(71) Applicant: SIEMENS HEALTHCARE GMBH, Erlangen (DE)

(72) Inventors: Yefeng Zheng, Princeton Junction, NJ (US); Shiyang Lu, Marsfield (AU); Xiaojie Huang, New Haven, CT (US)

(73) Assignee: SIEMENS HEALTHCARE GMBH, Erlangen (DE)

( * ) Notice: Subject to any disclaimer, the term of this patent is extended or adjusted under 35 U.S.C. 154(b) by 24 days.

(21) Appl. No.: 14/616,138

(22) Filed: Feb. 6, 2015

(65) Prior Publication Data

US 2015/0235360 A1     Aug. 20, 2015

Related U.S. Application Data

(60) Provisional application No. 61/940,924, filed on Feb. 18, 2014.

(51) Int. Cl.
| | |
|---|---|
| *G06K 9/00* | (2006.01) |
| *G06K 9/46* | (2006.01) |
| *G06K 9/62* | (2006.01) |
| *G06K 9/52* | (2006.01) |
| *G06T 7/00* | (2006.01) |

(52) U.S. Cl.
CPC ............ *G06K 9/4604* (2013.01); *G06K 9/46* (2013.01); *G06K 9/52* (2013.01); *G06K 9/6267* (2013.01); *G06T 7/0083* (2013.01); *G06T 7/0087* (2013.01); *G06T 7/0093* (2013.01); *G06K 2009/4666* (2013.01); *G06T 2207/10072* (2013.01); *G06T 2207/10081* (2013.01); *G06T 2207/10088* (2013.01); *G06T 2207/20072* (2013.01); *G06T 2207/20076* (2013.01); *G06T 2207/20081* (2013.01); *G06T 2207/30048* (2013.01); *G06T 2207/30101* (2013.01); *G06T 2207/30172* (2013.01)

(58) Field of Classification Search
None
See application file for complete search history.

(56) References Cited

U.S. PATENT DOCUMENTS

| | | | | |
|---|---|---|---|---|
| 7,940,974 | B2 * | 5/2011 | Skinner | G06K 9/34 382/131 |
| 8,571,278 | B2 * | 10/2013 | Sonka | G06K 9/4638 382/128 |
| 9,218,365 | B2 * | 12/2015 | Irani | G06F 17/30244 |
| 2008/0249755 | A1 | 10/2008 | Gulsun | |
| 2008/0267525 | A1 * | 10/2008 | Dai | G06T 3/403 382/266 |

(Continued)

OTHER PUBLICATIONS

PCT International Search Report mailed Jul. 20, 2015 corresponding to PCT International Application No. PCT/US2015/015741 filed Feb. 13, 2015 (17 pages).

(Continued)

*Primary Examiner* — Tahmina Ansari

(57) ABSTRACT

The coronary sinus or other vessel is segmented by finding a centerline and then using the centerline to locate the boundary of the vessel. For finding the centerline, a refinement process uses multi-scale sparse appearance learning. For locating the boundary, the lumen is segmented as a graph cut problem.

20 Claims, 3 Drawing Sheets

(56) References Cited

U.S. PATENT DOCUMENTS

| | | | |
|---|---|---|---|
| 2013/0034305 A1* | 2/2013 | Jahanshahi | G06K 9/00624 382/201 |
| 2013/0156348 A1* | 6/2013 | Irani | G06F 17/30244 382/305 |
| 2015/0235360 A1* | 8/2015 | Zheng | G06K 9/46 382/128 |

OTHER PUBLICATIONS

Zheng Yefeng et al: "Machine learning based vessel ness measurement for coronary artery segmentation in cardiac CT volumes", Medical Imaging 2011: Image Processing, SPIE, 1000 20th St. Bellingham WA 98225-6705 USA, vo 1. 7962, No. 1, Mar. 3, 2011 (Mar. 3, 2011), pp. 1-12, XP060009425; 2011.

Zheng Yefeng: "Robust and Accurate Coronary Artery Centerline Extraction in CTA by Combining Model-Driven and Data-Driven Approaches" Advances in Communication Networking : 20th EUNICE/IFIP EG 6.2, 6.6 International Workshop, Rennes, France, Sep. 1-5, 2014, Revised Selected Papers; [Lecture Notes in Computer Science, ISSN 1611-3349], Springer Verlag, DE, pp. 74-81, XP047042220; 2013.

Xiaojie Huang et al: "A Dynamical Appearance Model Based on Multiscale Sparse Representation: Segmentation of the Left Ventricle from 40 Echocardiography", Oct. 1, 2012 (Oct. 1, 2012), Medical Image Computing and Computer-Assisted Intervention MICCAI 2012, Springer Berlin Heidelberg, Berlin, Heidelberg, pp. 58-65, XP047018376; 2012.

W. T. Abraham, et al., "Cardiac resynchronization therapy for heart failure," Circulation, 108(21), pp. 2596-2603, 2003.

Y. Boykov, et al., "An experimental comparison of min-cut/max-flow algorithms for energy minimization in vision," IEEE Transactions on Pattern Analysis and Machine Intelligence, 26(9), pp. 1124-1137, 2004.

S. G. Duckett, et al., "Advanced image fusion to overlay coronary sinus anatomy with real-time fluoroscopy to facilitate left ventricular lead implantation in CRT," Pacing and Clinical Electrophysiology, 34(2), pp. 226-234, 2011.

M. P. Garcia, et al., "Coronary vein tracking from MSCT using a minimum cost path approach," In Eee International Conference on Biomedical Imaging (ISBI), pp. 17-20, 2010.

X. Huang, et al., Segmentation of 4D echocardiography using stochastic online dictionary learning, In MICCAI, pp. 57-65, 2013.

H. Ishikawa, et al., "Exact optimization for Markov random fields with convex priors," IEEE PAMI, 25(10), pp. 1333-1336, 2003.

B. M. Kelm, et al., "Detection, grading and classification of coronary stenosis in computed tomography angiography," In MICCAI, pp. 25-32, 2011.

D. Lesage, et al., "A review of 3D vessel lumen segmentation techniques: Models, features and extraction schemes," Medical Image Analysis, 13(6), pp. 819-845, 2009.

Y. L. Ma, et al., "An integrated platform for image-guided cardiac resynchronization therapy," Physics in Medicine and Biology, 57(10), pp. 2953-2968, 2012.

S. Ordas, et al., "A statistical shape model of the heart and its application to model-based segmentation," In Medical Imaging 2007: Physiology, Function and Structure from Medical Images, vol. 6511 of Proceedings of SPIE, 2007.

Y. Zheng, et al., "Four-chamber heart modeling and automatic segmentation for 3-D cardiac: CT volumes using marginal space learning and steerable features," IEEE Transactions on Medical Imaging, 27(11), pp. 1668-1681, 2008.

Y. Zheng, et al., "Machine learning based vesselness measurement for coronary artery segmentation in cardiac CT volumes," In SPIE, vol. 7962, pp. 1-12, 2011.

Y. Zheng, et al., "Robust and accurate coronary artery centerline extraction in CTA by combining model-driven and data-driven approaches," in MICCAI, 2013.

* cited by examiner

SPARSE APPEARANCE LEARNING-BASED SEGMENTATION

RELATED APPLICATIONS

The present patent document claims the benefit of the filing date under 35 U.S.C. §119(e) of Provisional U.S. Patent Application Ser. No. 61/940,929, filed Feb. 18, 2014, which is hereby incorporated by reference.

BACKGROUND

The present embodiments relate to segmentation in medical imaging. In particular, segmentation of heart vessels is provided.

Cardiac resynchronization therapy (CRT) is a challenging task for novice implanters and low-volume operators. Failure to implant a left ventricular (LV) lead is a common problem in CRT. This failure is often due to (1) the inability to cannulate the coronary sinus, (2) unfavorable venous anatomy resulting in the inability to find a stable lead position, or (3) failure to site the lead with acceptable pacing thresholds and without diaphragmatic pacing. Medical imaging may help to avoid improper lead placement. Precisely localizing the CS in imaging provides prior knowledge of coronary venous anatomy both in the selection of patients suitable for CRT and for the guidance of LV lead implantation.

Manual and semi-automatic segmentation methods facilitate identification and localization of coronary venous anatomy from three-dimensional (3D) whole-heart imaging acquisitions. Whole heart segmentation may be achieved automatically, but the coronary venous anatomy may have to be manually segmented by clinical experts. In semi-automatic approaches, defined start and end points of a vessel have to be given and labeled interactively. An automated approach uses a 3D anatomical model to extract cardiac chambers and large vessels, but extracts just a small part of the CS.

Automatic segmentation has been provided for coronary arteries for detecting coronary stenosis. Model-driven strategies utilize intensity based vesselness estimation approaches for extracting centerlines and segmenting coronary arteries. However, unlike coronary arteries, coronary venous vessels are commonly minute veins (e.g., with an even smaller radius and only a few voxels extended over the distal parts of the CS). Gross image inhomogeneity and poor contrast between regions of interest further complicate distinguishing the intensity variations of voxels inside and outside the CS vessel. Because of these significant challenges, automatic segmentation methods for extracting centerline or segmenting the CS vessel contour may fail to detect the coronary sinus accurately.

BRIEF SUMMARY

By way of introduction, the preferred embodiments described below include methods, systems, instructions, and computer readable media for segmentation in medical imaging. The coronary sinus or other vessel is segmented by finding a centerline and then using the centerline to locate the boundary of the vessel. For finding the centerline, a refinement process uses multi-scale sparse appearance learning. For locating the boundary, the lumen is segmented as a graph cut problem. The refinement or lumen segmentation may be used alone or in combination.

In a first aspect, a method is provided for segmentation of a vessel. A centerline for a vessel represented in medical imaging data representing a patient is extracted as a function of a cost term. The cost term is calculated as a function of similarity of patches of the medical imaging data to machine-learned appearance patterns at multiple scales relative to the medical imaging data. The cost term indicates membership as in the vessel or not in the vessel of different locations for the patches. The vessel as represented in the medical imaging data is segmented as a function of the centerline. An image of the vessel segmented from the medical imaging data is generated.

In a second aspect, a non-transitory computer readable storage medium has stored therein data representing instructions executable by a programmed processor for segmentation of a vessel. The storage medium includes instructions for determining probabilities of locations in a volume of a patient represented by medical imaging data being at a vessel boundary, constructing a Markov random field graph from the probabilities, extracting a contour of the vessel boundary from the Markov random field graph, and segmenting the vessel with the vessel boundary.

In a third aspect, a method is provided for segmentation of a coronary sinus vessel. A centerline of the coronary sinus vessel in a volume represented by computed tomography data is extracted as a function of sparse appearance modeling at multiple scales. Voxels of the volume belonging to the coronary sinus vessel are identified as a function of the centerline and a graph optimization. An image is generated from the voxels of the volume identified as belonging to the coronary sinus vessel.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Sparse appearance learning-based automatic coronary sinus segmentation is provided for cardiac resynchronization therapy. A high degree of variability in the coronary venous anatomy may make left ventricular epicardial lead placement and coronary sinus cannulation for cardiac resynchronization therapy more difficult. Precise and fully-automatic segmentation of the coronary sinus may assist. Intensity based vesselness estimation may not be sufficient for segmenting lumens of coronary sinuses. Coronary sinus is commonly a minute vein so the intensity profiles as the contrast between the venous vessel and back ground tissues is just slightly different.

Instead of intensity-based vesselness, multi-scale sparse appearance learning-based estimation of vesselness is used for automatically extracting the centerline. Instead of modeling the small variations of intensities among the voxels, the inherent spatial coherence of vessel and background tissue appearances are used to model the different appearance dictionaries and then calculate the vesselness of voxels. The sparse learning-based approach models the local appearance of vessels and background tissues with different series of appearance dictionaries, and then the appearance dictionaries discriminate image patterns by reconstructing the patterns in the process of sparse coding. An appearance discriminant is derived from the residues as the vesselness measurement score and incorporated into the model-driven based centerline extraction.

After centerline extraction, the lumen of the coronary sinus is then segmented using the centerline. The volume is resampled along the path of the centerline for the subsequent boundary detection. The probability of any given voxel being in the lumen or not is calculated. The optimal lumen surface is computed by correlating the boundary probabilities with a convex Markov random field (MRF)-based graph optimization.

Figure 1:
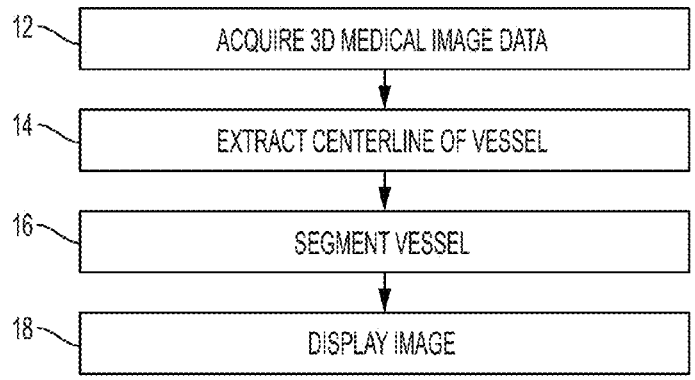
FIG. 1 is a flow chart diagram of one embodiment of a method for segmenting a vessel in medical imaging.

FIG. 1 shows a flow chart of a method for segmentation of a vessel, such as segmentation of a coronary sinus vessel. In the examples below, the segmentation will be of the coronary sinus vessel, but other vessels may be segmented.

Figure 8:
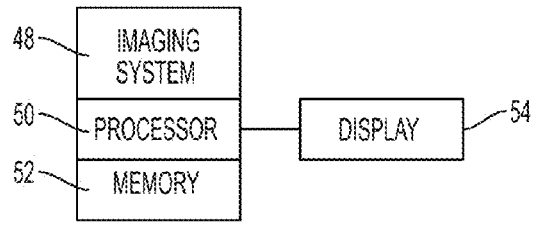
FIG. 8 is one embodiment of a system for segmentation of a vessel.

The method is implemented by the system of FIG. 8 or another system. For example, the method is implemented on a computer or processor of a magnetic resonance (MR), computed tomography (CT), ultrasound, positron emission tomography, single photon emission computed tomography, x-ray or other imaging system. As another example, the method is implemented on a picture archiving and communications system (PACS) workstation, server, personal computer, or computer-assisted detection computer.

The method is for segmenting a boundary. The boundary of a lumen is located. The segmentation may be locating, labeling, extracting, or separating (e.g., creating a separate volume just of voxels for the vessel and zero value voxels for other locations). Alternatively, the segmentation provides for different processing for different voxels, such as filtering differently depending on location.

The acts are performed in the order shown or other orders. Additional, different, or fewer acts may be provided. For example, the method is performed without displaying an image in act 18. As another example, the method includes user input of a point, line, area, or volume for a semi-automated approach.

In act 12, medical imaging data is acquired. The medical imaging data is one or more frames of data representing the patient. The dataset may be in any format. The medical imaging data may be a plurality of scalar values representing different locations in a Cartesian, polar coordinate, or other format. The medical imaging data is data from scan of a patient, such as intensities. In other examples, the medical imaging data is data formatted or previously displayed on a display, such as a plurality red, green, blue (e.g., RGB) values.

Any type of medical imaging data may be used. In one embodiment, the medical imaging data is from a scan of the patient, such as a magnetic resonance (MR) or computed tomography (CT) scan data. Magnetic resonance data is acquired with an MR system. The MR data is acquired using an imaging sequence of pulses for scanning a patient. In response to application of magnetic fields and one or more pulses, data representing an interior region of a patient is acquired. The magnetic resonance data is k-space data. Fourier analysis is performed to reconstruct the data from the k-space into object space. CT data is acquired with a CT system. A plurality of x-ray projections are acquired while a source of x-rays and an opposing x-ray detector are rotated about a patient by a gantry. The resulting projections may be reconstructed into object space.

The medical imaging data represents tissue, flow, velocity, and/or fluids within the patient. In some embodiments, the medical imaging data represents both flow and structure.

The medical imaging data represents a three-dimensional region of the patient. For example, the dataset represents a volume of the patient. Values are provided for each of multiple locations distributed in three dimensions (N×M×R where N, M, and R are integers greater than 1). The values and the corresponding locations may be voxels. The medical imaging data is acquired as a frame of data. The frame of data represents the scan region of the patient at a given time or period. Multiple frames of data representing the patient at different times may be acquired.

For segmenting, an initial segmentation of the medical imaging data may be performed. A processor locates heart chambers or other features of the heart in the volume as represented by the data. Any heart segmentation approach may be used, such as application of a machine-learnt classifier using intensities or gradients in intensities as the input features.

In act 14, a processor extracts a centerline for a vessel represented in medical imaging data. For example, a centerline for the coronary sinus is extracted from the volume as represented by the medical imaging data, such as CT data.

Any extraction may be used for initially locating the vessel of interest. For example, features of the vessel and/or features of surrounding tissue are used to determine a pose of the vessel from segmented heart data. The position, rotation, and scale of a model (e.g., mean shape of the vessel for a plurality of patients) of the vessel are fit to the data. The pose may be refined through optimization or other fitting. Other approaches may be used to initially locate the vessel of interest, such as pattern matching, template fitting, or other segmentation.

Based on the initial location of the vessel, an initial centerline is determined. For example, skeletonization or region shrinking is applied to the initial vessel locations. As another example, a center of gravity, line fit, or other process is applied to find the centerline.

The centerline is formatted in any manner, such as labeling voxels intersecting the centerline. In one embodiment, the initial centerline is represented as a set of evenly sampled voxel points $P_i$, for i=0, 1, . . . , n−1. For each voxel point $P_i$, a plane is defined orthogonal to the centerline. The plane has any extent, such as 41×41 uniformly sampled candidate positions P on the same plane. The voxels from the frame of scan data are resampled to the planes. The candidates P are sampled on a regular grid, such as a grid of 20×20 mm with grid spacing of 0.5 mm centered at the initial center-line point. The candidates P represent possible refined locations for the centerline in a given plane. By resampling along a plurality of planes evenly spaced along the initial centerline, a volume region of candidates P results. In other embodiments, candidates are defined differently, such as any voxel within a given Euclidian distance of the initial centerline.

Figure 2:
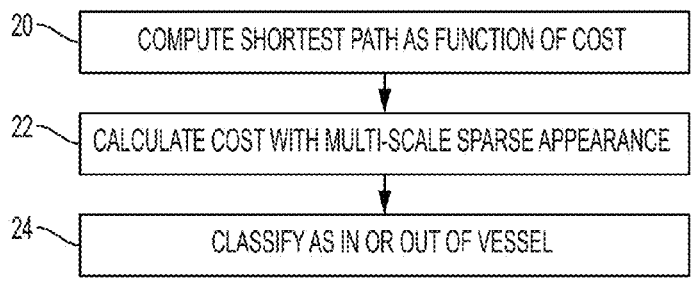
FIG. 2 is a flow chart diagram of one embodiment of a method for extracting a centerline of a vessel.

This initial centerline is then refined. FIG. 2 shows one embodiment of a method for extracting the centerline given an initial centerline estimate. A dynamic programming based optimization is applied to refine the initial centerline path. The method of FIG. 2 represents a multi-scale sparse appearance-based refinement. The extraction is a function of sparse appearance modeling at multiple scales. Additional, different, or fewer acts may be provided. For example, sparse appearance may be used without multi-scale or vise versa. As another example, a cost is not calculated in act 22. In yet another example, a shortest path computation is not used in act 20.

In act 20, the extraction is performed by computing a shortest path. The shortest path through the candidate locations is found. The processor solves the problem as a shortest path computation problem to select the best position for each voxel point $P_i$ forming the centerline from the candidates P. Rather than defining a straight line or overly simple curve, the shortest path is limited or informed by a cost term with or without other terms. For example, the cost incorporates a fitting, likelihood, or other weighting based on the data. The path length weights the solution towards a shortest path but limited by the cost.

In one embodiment, the shortest path computation is represented as equation 1:

$$\overline{P}_0^{J(0)}, \overline{P}_1^{J(1)}, \ldots, \overline{P}_{n-1}^{J(n-1)} = \mathrm{argmin}_{\overline{P}_i^{J(i)}} \Sigma_{i=0}^{n-1} C(\overline{P}_i^{J(i)}) + \omega \Sigma_{i=0}^{n-2} \|\overline{P}_i^{J(i)} - \overline{P}_{i+1}^{J(i+1)}\| \quad (1)$$

The first term is the cost, C, for a single node or candidate P, measuring how likely this voxel is at the center of the vessel. The second term is the total length of the path by summing the Euclidean distance between two neighboring points, $P_i$–$P_{i+1}$, on the path. Free parameter $\omega$ is used to balance the two terms. The free parameter may be heuristically tuned on a few data sets and then fixed for further use. Alternatively, the free parameter is manually set.

Any cost may be used. For example, the probabilistic scores of each voxel being a coronary sinus (vesselness used for the node costs) are learned and estimated via intensity features. In embodiments discussed below, an alternative solution using the multi-scale sparse learning-based approach calculates the likelihood of a voxel being the coronary sinus vessel (i.e., determines the vesselness of the voxel). The centerline is refined with multi-scale sparse appearance.

In act 22, the processor calculates the cost for finding the refined centerline. The cost term, such as cost C in equation 1, is used to extract the centerline. The appearance is used to calculate the cost. In cardiac CT or other medical imaging data, lumen and background tissues present different appearance in terms of local image patterns. The appearance of a local area is relatively constant.

Using appearance, the cost is calculated using similarity of patches of the voxels to machine-learned appearance patterns. Sparse coding based on appearance is used. For each candidate P, a patch of any size (e.g., 5×5×5 voxels) is defined. This patch represents a pattern or appearance. The patch may be compared to a dictionary of reference patterns or appearances. In one embodiment, the dictionary appearance are atoms learned by machine-training from known truth (e.g., coronary sinus vessel or not) training data. In other embodiments, the dictionary atoms are pre-programmed, expert created, or defined in other ways than machine learning.

The similarity in appearance is determined at any number of scales. One scale, such as the scale of the existing frame of data, may be used. In one embodiment, the appearance similarity is calculated for multiple scales, such as 2-12 scales (e.g., 8, 9, or 10). The different scales are formed by spatially decimating and/or filtering the voxels. The frame of data is resampled at different resolutions. For each scale, a patch for each given candidate is formed. The cost is calculated for each scale and then later combined.

To calculate the cost, the voxels for each patch are formatted as an appearance vector. Any format may be used. In one embodiment, let $\Omega$ denote the 2D medical imaging data (e.g., pixel). For each plane defined relative to the centerline, a 2D region is used. In other embodiments, the patch is defined in three dimensions.

Figure 3:
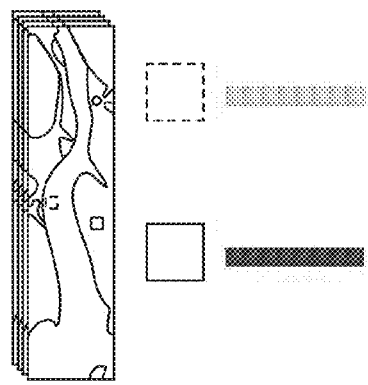
FIG. 3 illustrates example appearance patches for in and out of the vessel.

The multi-scale local appearance at a voxel $u \in \Omega$ in frame $I_t$ is described with a series of appearance vectors $y_t^k(u) \in R^n$ at different appearance scales $k=1, \ldots, K$. $y_t^k(u)$ is constructed by concatenating orderly pixels within a block or other shape centered at the voxel u. FIG. 3 shows an example in two-dimensions. Two example patches are extracted, one in the vessel (upper patch) and one in the background tissue (lower patch).

As image data or pixels, the patches have two dimensions. The appearance vector is this patch or is formed by ordering the pixels in a linear representation. For example, rows of pixels are connected to form a one dimensional appearance vector.

Modeled with a sparse representation, an appearance vector $y \in R_n$ may be represented as a sparse linear combination of the atoms from an appearance dictionary $D \in R^{n \times K}$, $K > n$. The appearance dictionary encodes the typical patterns of a corresponding appearance class. Any number of classed may be used, such as coronary sinus vessel and background tissue classes. Different classes of local appearance are modeled with different appearance dictionaries. Learning an over complete dictionary $D \in R^{n \times K}$ from a training set $Y = [y_1, \ldots, y_M]$ of M appearances is addressed by solving a minimization problem, such as:

$$\mathrm{min}_{D,X} \|Y - DX\|_2^2 + \lambda \|X\|, s.t., \forall i, \|x_1\|_{l1} \leq 1 \quad (2)$$

where $X = [x_1, \ldots, x_M]$ represents the sparse representation of Y. Other solutions may be used. Any machine learning may be used, such as the K-SVD algorithm, in solving the dictionary learning problem. The resulting dictionary of appearance atoms is a sparse appearance model.

The similarity is calculated using reconstruction residues of the appearance vectors with the machine-learned appearance patterns. The appearance dictionaries for the vessel and for background tissue are applied to the appearance vectors or data of the patches.

For extracting the centerline from a coronary sinus, two classes of local appearance, the lumen of vessels and the background tissues, are used. Let $\Omega^1$ and $\Omega^2$ denote two classes of local appearance in the frame $I_t$. FIG. 3 shows two patches and corresponding appearance vectors, one for the vessel and one for background tissue. Any appearance vector from data may be reconstructed by a sparse representation with the corresponding appearance dictionary. Two appearance dictionaries $D_1$ and $D_2$ are trained by samples from the voxels around the lumen center of the vessels and the background tissues, respectively.

For a given voxel or pixel, the patch is reconstructed using the dictionary terms. In an appearance model, the similarity is indicated as reconstruction residues. The differences of a given patch or appearance vector from a set or individual ones of the atoms of the dictionary are the reconstruction residue. The appearance vector is reconstructed as closely as possible using the dictionary. Any remaining differences indicate the similarity. The difference from the sparse encoding classifies the patch. The magnitude of the difference represents a probability of vesselness.

The reconstruction residue of an appearance vector $y_i$ from class i with respect to dictionary $D_c$ at k-th scale is defined as:

$$\{R(y_i(u), D_c)\}_k = \|y_i^k(u) - \{D_c \hat{x}_{ic}(u)\} k\|_2, \forall i, c \in \{1,2\}, \quad (3)$$

where $\hat{x}_{ic}$ is the sparse representation of $y_i$ obtained by solving the sparse coding. The reconstructed appearance vectors from the lumen class $\Omega^1$ are strongly dependent on the dictionary $D_1$ trained from the lumen samples, rather than the dictionary $D_2$ trained from the background tissues. Thus, $\{R(y_1(u))\}_k > \{R(y_2(u))\}_k$ when $u \in \Omega^2$, and $\{R(y_1(u))\}_k < \{R(y_2(u))\}_k$ when $u \in \Omega^1$ at the k-th appearance scale. This reconstruction provides residues that indicate the membership in the vessel or not (e.g., background tissue) of each pixel or voxel. A lesser residue for one class as compared to others indicates membership in that class. This local appearance discrimination is used to estimate the lumen centers. The result for each candidate P provides a probability of the voxel or pixel being at the centerline.

Using multiple scales, the similarities are calculated at each of the different scales for each of the locations. The cost term indicating membership as in the vessel or not in the vessel for the patches is calculated for the different scales.

The cost terms or vesselness from the different scales for a same location are combined. By combining the multi-scale information, a vesselness score for each candidate P is provided. The similarities from the multiple scales are combined to provide one probability of being a vessel location.

Any combination may be used, such as a sum or a weighted averaging. In one embodiment, the combination is represented as:

$$p(u) = \sum_{k=1}^{K} \left( \log \frac{1}{\beta_k} \right) \{ \mathrm{sgn}(R_t^1(u)_k - R_t^2(u)) \}_k \quad (4)$$

where $\beta_k$'s are the weighting parameters of k-th appearance scale. This probability, p, indicates the likelihood for candidate u of being inside the lumen, which can be substituted into the shortest path computation of equation (1) as the cost for a single node. The voxels at the lumen center have a high vesselness score by the local appearance discrimination calculation of equation (4).

A classification of the location as being in or out of the vessel is provided in act 24. This probability is used in the computation of the shortest path function to solve for the centerline. The resulting refinement of the centerline more accurately represents the location of the centerline, such as the centerline of the coronary sinus represented by the medical imaging data.

Returning to FIG. 1, the vessel is segmented in act 16. The locations or voxels for the vessel are labeled as such. The vessel as represented in the medical imaging data is located. Voxels of the volume belonging to the coronary sinus vessel are identified.

Figure 4:
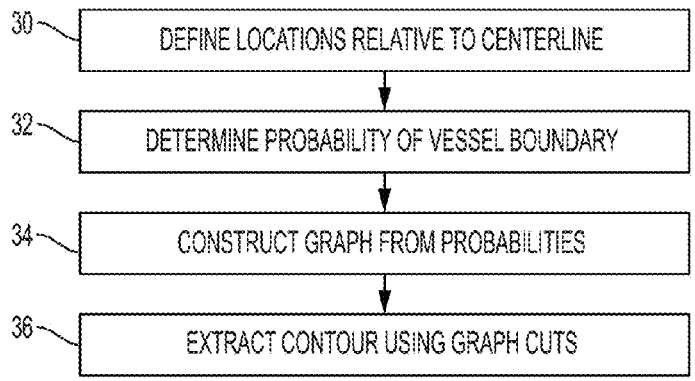
FIG. 4 is a flow chart diagram of one embodiment of a method for segmenting with graph cuts.

Any approach for identifying a voxel as being for the vessel or being for background tissue may be used. In one embodiment, the processor identifies as a function of the centerline and a graph optimization. FIG. 4 shows an example of segmenting as a function of the centerline. Once the centerline is extracted, the volume is warped and resampled in act 30 along the path of the resulting centerline for subsequent boundary detection. The optimal lumen surface is further computed by correlating the boundary probabilities in act 32 with a convex Markov random field (MRF)-based graph optimization approach.

Other approaches may be used. Additional, different, or fewer acts may be provided. For example, warping or resampling in act 30 is not provided. In another example, a graph-based approach of acts 32 and 34 are not used.

In act 30, the processor segments using the centerline. The centerline is used to define the locations analyzed for detecting the boundary of the vessel. The centerline is straightened to a straight line. Planes orthogonal to the centerline are defined. Given the curvature of the centerline, some planes may or may not intersect. The medical imaging data is interpolated to the planes, or a nearest neighbor selection is used. These planes are conceptually stacked in a cylinder. The boundary of the vessel may be located by detection in each plane.

Figure 5:
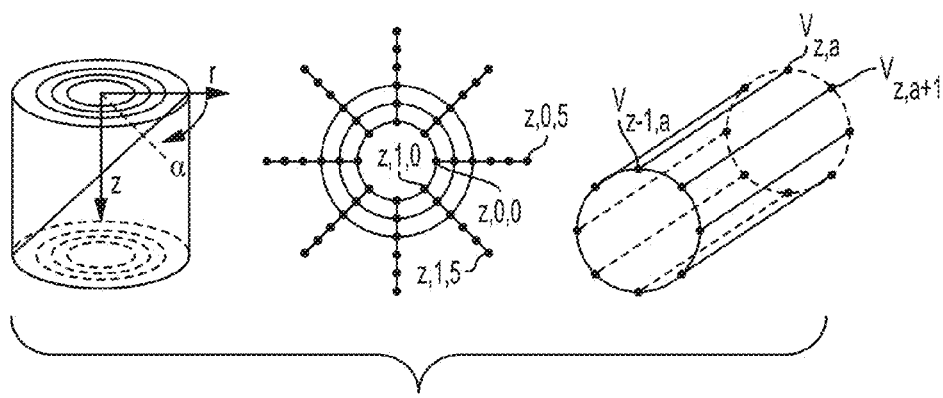
FIG. 5 illustrates example resampling of the patient volume for segmentation.

FIG. 5 illustrates an example embodiment of defining the locations in act 30. A warped and re-sampled version of the volume is generated. The centerline is resampled to a certain resolution (e.g. 0.1 mm) to get a homogeneous slice distance and thus avoid image distortion. For each centerline point, an image slice orthogonal to the vessel centerline is extracted. The image or pixels on the slice are interpolated with bi-linear or other interpolation at positions between voxels. The height (along the centerline) in the warped volume is expressed by the coordinate z, whereas the angle is expressed as $\alpha = [0, 2\pi)$ and the radial distance is expressed as $r \in R \geq 0$ from a pole that uniquely defines a point in two dimensions. The middle illustration of FIG. 5 shows a plane and radial sample points. The left illustration shows a resulting cylindrical coordinate space. The right illustration shows a tubular MRF graph.

In act 32, a probability of a sample point being at and/or within the boundary of the vessel is determined. The processor determines the probabilities of locations in the resampled and warped volume as being at a vessel boundary or not. Since the volume applied is based on the centerline, the probabilities are determined as a function of the centerline.

Any probability calculation may be used. In one embodiment, the probabilities calculated as the cost term for extracting the centerline are used. In another embodiment, a machine-trained classifier is applied. For example, intensity, gradient features, appearance, and/or other features are used to train a classifier. The resulting determinative feature set is input to the learned classifier for a given volume.

In one embodiment, boundary candidate points are then generated for an equidistant selection of slices $z \in [1, Z]$ of the warped volume (e.g., for every 5th slice). This sparse selection of slices may result in more efficient calculation. For each selected slice, R points along K rays are generated. By this way, $K \times Z \times R$ directed candidate boundary points are generated. An edge detection machine-learned classifier calculates the probability for each of the R points. The machine-learnt classifier outputs probability, such as the output of a classifier of a support vector machine or Bayesian network. The predicted boundary probability is a scalar between [0,1]. Other probability designations may be used, such as binary or percentages.

In act 34, the processor determines a minimally cut graph for a Markov Random Field. The Markov random field graph is constructed from the probabilities. The Markov random field graph is a network graph of vertices and edges labeled with the probabilities.

In one embodiment, out of all potential boundary candidates, the optimum boundary options are selected as the final segmentation results. The problem is formulated as a first order Markov random field (MRF), but other order MRF may be used. The MRF has discrete multivariate random variables where the variables are the boundary position. A globally optimal configuration for MRFs is found by calculating the minimal cut in a graph. The surface segmentation task is reformulated into a network flow problem. The network flow problem may be solved efficiently based on the max-flow algorithm or other algorithms.

To construct the graph, the boundary candidates are reorganized in a form such that the candidates incorporate the probability distribution of a $N_R$-label graph-cut problem on the space, $X=L^V=\{0 \ldots N_R-1\}^{\{0 \ldots Ns-1\} \times \{0 \ldots Na-1\}}$, where the probabilities of the candidates along with $N_R$-configurations of ray length are denoted as label assignments $L=\{0 \ldots N_R-1\}$—for every slice $N_S$ and every ray $N_A$. The corresponding candidates are denoted as the set of vertices V in MRF notation. Thus, a vertex $v_{z,a} \in V$ of the MRF graph represents one element in the problem domain as z is attached to the corresponding slice and a to the ray angle. The right illustration of FIG. 5 shows an example. A network graph $\hat{G}=(\hat{V},\hat{E})$ may be constructed with the dimensionality as $N_R \times N_S \times N_A$. Other graphs may be constructed.

In act 36, the processor extracts a contour of the vessel boundary from the Markov random field graph. The maximum flow-minimum cut is calculated. The minimum cut of the Markov random field graph is found. Graph partition is used to extract the contour of the vessel as represented in the warped volume. After the graph construction, a max-flow-min-cut algorithm is utilized to extract the contour. The minimal "s-t" cut bi-partitions the network graph $\hat{G}$ into two groups S, T along the set of labels L such that each vertex $v_{z,a,t} \in V$ is assigned a unique label $i \in \{0 \ldots N_R-1\}$. The lumen surface is extracted as a set of contours corresponding to the cross-sections. A contour is generated by determining the length for all $N_A$ rays.

A cylindrical-to-Cartesian coordinate transform may be applied. The transform yields the set of three-dimensional points in the resampled and warped volume space that form the contour at a specific cross-section. The third dimension of the contour points is given by the number of the current slice, which is attached to a centerline point.

The warped and resampled volume has a known spatial relationship with the actual volume represented by the medical imaging data. The contour is warped as a function of the curved centerline of the vessel in the patient. The inverse operation to warp the volume is applied to the contour. The contours that now describe the lumen surface in the warped volume (i.e., the set of parallel slices) are warped back to the original volume space to be aligned with V.

The contour or contours in the object space or of the original volume delineate the vessel from background. Voxels within the contour belong to the vessel, and voxels outside the contour belong to the background. The voxels are labeled, providing the segmentation of act 16 in FIG. 1. The segmentation may be the labeling. Alternatively, a dataset of just vessel voxels with other voxels set to zero is created as the segmentation. Other segmentation may be used, such as filtering differently or performing another process to enhance locations of the vessel relative to other locations.

In act 18, an image of the vessel segmented from the medical imaging data is generated. The image is displayed. The image is a function of the boundary or segmentation output in act 16.

The image is a three-dimensional rendering of the vessel identified from the segmentation. For example, a projection or surface rendering of the voxels or volume to the two-dimensional screen is displayed. The voxels identified as belonging to the coronary sinus vessel are rendered to pixels, generating an image. In other embodiments, one or more cross-sections or planes in the volume are defined, and two-dimensional images of the vessel are generated from voxels on or near the planes (e.g., multi-planar reconstruction imaging).

The image may be the medical image with the boundary overlaid as a semi-transparent or other graphic. For example, a color (e.g., blue or red) or graphic is used to highlight the boundary on the medical image. Background tissue is also shown. The segmentation indicates the location for highlighting, coloring, or other enhancement to distinguish the vessel structure from other tissue. Different filtering, transform functions, or other processing of voxels in the vessel as opposed to voxels outside the vessel may be used to highlight the segmented vessel. In other embodiments, only the vessel voxels are used for imaging.

In another embodiment, the image includes text. The text represents a calculated quantity. The boundary is used for calculating the quantity, such as an area, an amount of stenosis, a volume flow, or other quantity derived from the boundary. A combination of the medical image with the boundary and text for a quantity may be output as the image.

The image is displayed on a display of a medical imaging system, such as an MR or CT system. Alternatively, the image is displayed on a workstation, computer or other device. The image may be stored in and recalled from a PACS memory.

The output may be provided as part of any application. For example, the output is part of a cardiac resynchronization therapy application. Other applications include vessel segmentation tools, blood flow tools, or vessel analysis applications. For example, the boundary segmentation is part of an application for cardiovascular assessment to assist radiologists or cardiologists.

The multi-scale sparse appearance-based centerline extraction and graph-cut lumen segmentation are tested with 204 cardiac CT datasets (i.e., frames of data). For testing, the coronary sinus centerline and lumen meshes (contour) are manually annotated. 10-fold cross-validation is used to train the models and perform evaluations.

The centerline tracing accuracy is evaluated by measuring the point-to-point correspondence distance. A centerline point is detected correctly if its distance to the corresponding ground truth point is no more than the radius of the annotation lumen at that point. The lumen segmentation accuracy is evaluated by the mean square distance (MSD), which calculates the similarity of a segmented triangulated mesh to the ground truth standard. It is a mesh-to-mesh error measurement based on point-to-triangle distances.

For centerline extraction accuracy, two different centerline extraction approaches are used to generate the centerline. Both approaches are model-driven approaches. The first approaches utilizes the intensity estimation method to measure the vesselness of the voxel, as taught by Y. Zheng, et al., in "Robust and accurate coronary artery center-line extraction in CTA by combining model-driven and data-driven approaches" in MICCAI, 2013. The second approach uses the multi-scale (e.g., 10 scales) sparse appearance.

Table 1 shows the centerline accuracy on the evaluation set. Centerlines extracted with the multi-scale sparse appearance outperform the method based on learning with voxel intensity (i.e., mean point-to-point error of 1.045 mm vs. 2.645 mm).

| Methods | Mean Error (mm) | | | | | |
|---|---|---|---|---|---|---|
| | Mean | Std | Median | Minimum | Maximum | 80% |
| Intensity Estimation (IE) [13] | 2.645 | 1.425 | 2.27 | 0.925 | 9.555 | 3.35 |
| Proposed Sparse Coding (SC) Method | 1.045 | 0.575 | 0.85 | 0.45 | 3.065 | 1.395 |

The multi-scale sparse learning-based vesselness is more effective on automatically distinguishing the voxels inside and outside the lumen of the vessel.

Figure 6:
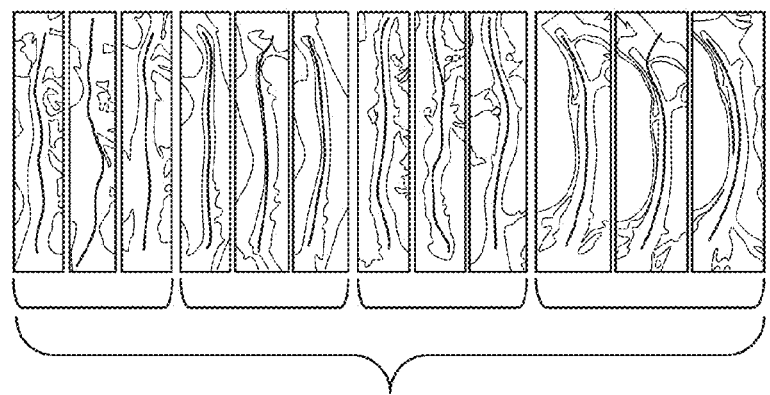
FIG. 6 shows examples of centerline location extraction.

FIG. 6 shows examples of the extracted centerlines on cross-sectional planar images of a sampling of the datasets. The different samples are separately bracketed. The first column of each example is the ground truth. The second column is the centerline extracted by intensity estimation. The third column is the centerline extracted by multi-scale sparse appearance vesselness.

To evaluate lumen segmentation accuracy, the impact of the resulting centerline generated by the multi-scale sparse learning-based vesselness is analyzed. The graph-cut approach is used with the centerlines from the different approaches. Table 2 shows the comparison results in terms of the lumen segmentation accuracy fed by the different centerlines.

| Methods | Average MSD (mm) | | | | | |
|---|---|---|---|---|---|---|
| | Mean | Std | Median | Minimum | Maximum | 80% |
| Intensity Estimation-(IE) [12] | 1.58 | 1.195 | 1.085 | 0.34 | 7.065 | 2.23 |
| Proposed Method-(weighted SC & IE) | 0.745 | 0.53 | 0.585 | 0.245 | 2.925 | 0.925 |

The average MSD of lumen segmentation results fed by the centerlines extracted with the intensity estimation approach is 1.58 mm. The average MSD is reduced to 0.745 mm when fed with the centerlines extracted by multi-scale sparse appearance approach.

Figure 7:
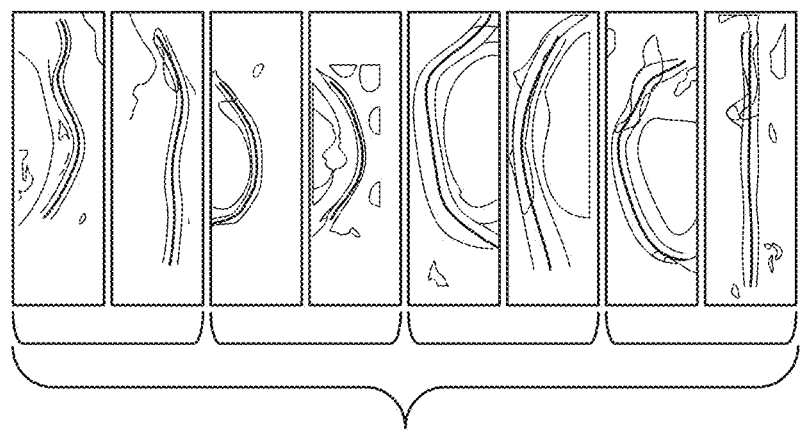
FIG. 7 shows examples of lumen segmentation.

FIG. 7 shows lumen segmentation using centerlines extracted by multi-scale sparse appearance. Different examples are bracketed. The first column in each bracket is the segmentation fed by the centerline extracted by intensity estimation. The second column is the segmentation fed by the centerline obtained by multi-scale sparse appearance.

The sparse appearance learning-based approach may effectively distinguish the voxel being inside the vessel or belonging to the background tissues. As compared to other automated segmentation applied to the coronary sinus, the estimation accuracy of the lumen center and hence lumen segmentation accuracy is improved.

FIG. 8 shows a system for segmentation of a vessel, such as a coronary sinus. The system includes an imaging system 48, a memory 52, a processor 50, and a display 54. Additional, different, or fewer components may be provided. For example, a network or network connection is provided, such as for networking with a medical imaging network or data archival system. In another example, a user interface is provided.

The processor 50, memory 52, and display 54 are part of the medical imaging system 48. Alternatively, the processor 50, memory 52, and/or display 54 are part of an archival and/or image processing system, such as associated with a medical records database workstation or server. In other embodiments, the processor 50, memory 52, and/or display 54 are a computer, such as desktop or laptop, a workstation, a server, a network, or combinations thereof.

The imaging system 48 is a medical diagnostic imaging system. Ultrasound, computed tomography (CT), x-ray, fluoroscopy, positron emission tomography, single photon emission computed tomography, and/or magnetic resonance (MR) systems may be used. The imaging system 48 may include a transmitter and includes a detector for scanning or receiving data representative of the interior of the patient.

In one embodiment, the imaging system 48 is a CT system. An x-ray source is connected with a gantry. A detector is also connected with the gantry opposite the x-ray source. The patient is positioned between the source and detector. The source and detector are on opposite sides of the patient and rotate about the patient. The detected x-ray energy passing through the patient is reconstructed or transformed into data representing different spatial locations within the patient.

In another embodiment, the imaging system 48 is an MR system. The MR system includes a main field magnet, such as a cryomagnet, and gradient coils. A whole body coil is provided for transmitting and/or receiving. Local coils may be used, such as for receiving electromagnetic energy emitted by atoms in response to pulses. Other processing components may be provided, such as for planning and generating transmit pulses for the coils based on the sequence and for receiving and processing the received k-space data. The received k-space data is converted into object or image space data with Fourier processing.

The memory 52 may be a graphics processing memory, a video random access memory, a random access memory, system memory, cache memory, hard drive, optical media, magnetic media, flash drive, buffer, database, combinations thereof, or other now known or later developed memory device for storing data or video information. The memory 52 is part of the imaging system 48, part of a computer associated with the processor 50, part of a database, part of another system, a picture archival memory, or a standalone device.

The memory 52 stores data representing a region of a patient. The region is a three-dimensional region. The region includes the heart or other cardiac volume. The data is from scanning the region by the imaging system 48. The memory 52 may alternatively or additionally store data during processing, such as storing appearance dictionaries, machine-learnt classifiers (e.g., matrices), values for input features, frames of data at different scales, centerline locations, resampled and/or warped volume datasets, segmented heart data, detected boundaries, constructed graphs, probabilities, cost term values, length values, distances, graphic overlays, quantities, an output image, or other information discussed herein.

The memory 52 or other memory is alternatively or additionally a non-transitory computer readable storage medium storing data representing instructions executable by the programmed processor 50 for segmentation of a vessel. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 50 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for segmentation of a vessel. The processor 50 is a single device or multiple devices operating in serial, parallel, or separately. The processor 50 may be a main processor of a computer, such as a laptop or desktop computer, or may be a processor for handling some tasks in a larger system, such as in an imaging system. The processor 50 is configured by instructions, design, hardware, and/or software to perform the acts discussed herein.

The processor 50 is configured to implement the acts of FIGS. 1, 2, and 4. For example, the processor 50 is configured to acquire data from memory or medical imaging system 48, extract a centerline, segment the vessel using the centerline, and generate an image using the segmentation. The processor 50 causes the image to be displayed on a display. The processor 50 is configured to perform a transformation of the scan data with a technical solution to the technical problem of identifying representation of a specific vessel. As part of the solution, the processor 50 interacts with the medical imaging system 48 or other source of scan data, stores data in different parts of the memory 52, and generates output to assist in medical diagnosis and/or therapy. Manual segmentation is highly inefficient, not cost effective, and uses different mental processes than the technical solution.

The display 54 is a monitor, LCD, projector, plasma display, CRT, printer, or other now known or later developed devise for outputting visual information. The display 54 receives images, graphics, text, quantities, or other information from the processor 50, memory 52, or imaging system 48. One or more medical images are displayed. The images are of a region of the patient, such as images including the coronary sinus. The image includes an indication, such as a graphic or colorization, of the boundary or other segmentation. Alternatively or additionally, the image includes a quantity based on the boundary. The quantity may be displayed as the image without the medical image representation of the patient.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for segmentation of a vessel, the method comprising:
   extracting a centerline for a vessel represented in medical imaging data representing a patient, the extracting being a function of a cost term;
   calculating the cost term as a function of similarity of patches of the medical imaging data to machine-learned appearance patterns at multiple scales relative to the medical imaging data, the cost term indicating membership as in the vessel or not in the vessel of different locations for the patches;
   segmenting the vessel as represented in the medical imaging data, the segmenting being a function of the centerline; and
   generating an image of the vessel segmented from the medical imaging data.

2. The method of claim 1 wherein extracting comprises extracting the centerline for a coronary sinus.

3. The method of claim 1 wherein extracting comprises computing a shortest path as a function of the cost term.

4. The method of claim 1 wherein extracting comprises extracting as a function of the cost term and a path length.

5. The method of claim 1 wherein calculating comprises forming an appearance vector for each patch of voxels of the medical imaging data, calculating reconstruction residues of the appearance vectors with the machine-learned appearance patterns, and classifying the patches as a function of the reconstruction residues.

6. The method of claim 1 wherein calculating comprises applying appearance dictionaries for the vessel and for background tissue to the patches.

7. The method of claim 1 wherein calculating comprises calculating as a multi-scale sparse appearance model.

8. The method of claim 1 wherein calculating comprises calculating the similarities at each of the multiple scales for each of the different locations, and weighted averaging the similarities from the multiple scales.

9. The method of claim 1 wherein segmenting comprises:
   defining planes along and orthogonal to the centerline and resampling the medical imaging data along the planes; and
   detecting a boundary of the vessel in each of the planes.

10. The method of claim 1 wherein segmenting comprises determining a boundary probability for different points being at a boundary of the vessel.

11. The method of claim 10 wherein segmenting further comprises determining a minimally cut graph for a Markov Random Field.

12. The method of claim 1 wherein generating the image comprises generating a three-dimensional rendering of the vessel identified from the segmenting.

13. In a non-transitory computer readable storage medium having stored therein data representing instructions executable by a programmed processor for segmentation of a vessel, the storage medium comprising instructions for:
   determining probabilities of locations in a volume of a patient represented by medical imaging data being at a vessel boundary;

constructing a Markov random field graph from the probabilities;

extracting a contour of the vessel boundary from the Markov random field graph; and segmenting the vessel with the vessel boundary.

14. The non-transitory computer readable storage medium of claim 13 wherein determining the probabilities comprises applying a machine-learnt classifier.

15. The non-transitory computer readable storage medium of claim 13 wherein constructing comprises constructing the Markov random field graph as a network graph of vertices and edges labeled with the probabilities.

16. The non-transitory computer readable storage medium of claim 13 wherein extracting comprises calculating a maximum flow-minimum cut.

17. The non-transitory computer readable storage medium of claim 13 wherein extracting comprises finding a minimum cut of the Markov random field graph.

18. The non-transitory computer readable storage medium of claim 13 further comprising defining the locations relative to a straightened centerline of the vessel and warping the contour as a function of a curved centerline of the vessel in the patient.

19. The non-transitory computer readable storage medium of claim 13 further comprising locating a centerline of the vessel with multi-scale sparse appearance; and wherein determining the probabilities comprises determining the probabilities as a function of the centerline.

20. A method for segmentation of a coronary sinus vessel, the method comprising:

extracting a centerline of the coronary sinus vessel in a volume represented by computed tomography data, the extracting being a function of sparse appearance modeling at multiple scales;

identifying voxels of the volume belonging to the coronary sinus vessel as a function of the centerline and a graph optimization; and generating an image from the voxels of the volume identified as belonging to the coronary sinus vessel.

* * * * *